United States Patent
Chen et al.

(10) Patent No.: US 7,701,847 B2
(45) Date of Patent: Apr. 20, 2010

(54) INTER-CARD CHANNEL PROTECTION METHOD IN WAVELENGTH DIVISION MULTIPLEXED SYSTEM

(75) Inventors: Hong Chen, Shenzhen (CN); Chunfan Hou, Shenzhen (CN); Wei Fu, Shenzhen (CN); Jun Yan, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 810 days.

(21) Appl. No.: 11/247,312

(22) Filed: Oct. 11, 2005

(65) Prior Publication Data

US 2006/0092830 A1     May 4, 2006

Related U.S. Application Data

(63) Continuation of application No. PCT/CN2004/000332, filed on Apr. 9, 2004.

(30) Foreign Application Priority Data

Apr. 9, 2003    (CN)    ................................ 03 1 10039

(51) Int. Cl.
 H04J 1/16    (2006.01)
 H04L 1/00    (2006.01)
 H04L 12/26   (2006.01)

(52) U.S. Cl. ..................................................... 370/217

(58) Field of Classification Search .................. 370/216, 370/217
See application file for complete search history.

(56) References Cited

U.S. PATENT DOCUMENTS

2002/0101633 A1 *  8/2002  Onaka et al. ................. 359/119

(Continued)

FOREIGN PATENT DOCUMENTS

CN          1321004 A       11/2001

(Continued)

OTHER PUBLICATIONS

European Office Action for European Application No. 04 726 712. 5—1237, dated May 10, 2007.

(Continued)

*Primary Examiner*—Seema S Rao
*Assistant Examiner*—Jianye Wu
(74) *Attorney, Agent, or Firm*—Brinks Hofer Gilson & Lione

(57) ABSTRACT

Disclosed is an inter-card channel protection method in a wave-length division multiplexing system. At the transmitting end, signals from the client side are divided via a coupler into two paths which are delivered to two cards, respectively. The two paths of signal transmitted by the two cards are sent via different routes to the receiving end. At the receiving end, the two paths of signal enter two cards, respectively, and the two cards communicate with each other directly. The standby card submits the signal quality detected by a detecting device to the primary card. The switching control unit on the primary card issues the commands of switching on/off the client-side lasers to the standby card in accordance with a decision made. One of the client-side lasers on the primary card and standby card is switched on while the other is switched off. The merits of this method include: protection can be realized with failures of card or essential chips thereon; protection switching can still be conducted with failures of system control unit; and, direct transfer of switching conditions and switching commands between the two cards is faster than communications with a system control unit via mailbox respectively.

17 Claims, 2 Drawing Sheets

U.S. PATENT DOCUMENTS

| | | | |
|---|---|---|---|
| 2002/0196794 A1* | 12/2002 | Bloch et al. | 370/401 |
| 2003/0119475 A1* | 6/2003 | Choi | 455/403 |
| 2003/0135389 A1* | 7/2003 | Gudapakkam et al. | 705/2 |
| 2003/0231886 A1* | 12/2003 | Young et al. | 398/101 |
| 2004/0001718 A1* | 1/2004 | Matthews et al. | 398/98 |
| 2006/0092830 A1* | 5/2006 | Chen et al. | 370/217 |

FOREIGN PATENT DOCUMENTS

| | | |
|---|---|---|
| EP | 1 113 587 A1 | 7/2001 |
| EP | 1 261 157 A2 | 11/2002 |
| JP | 07143105 A | 6/1995 |

OTHER PUBLICATIONS

International Search Report for PCT/CN2004/000332, May 19, 2005.

* cited by examiner

INTER-CARD CHANNEL PROTECTION METHOD IN WAVELENGTH DIVISION MULTIPLEXED SYSTEM

CROSS-REFERENCES TO RELATED APPLICATIONS

This is a continuation of International Application No. PCT/CN2004/000332, which was filed on Apr. 9, 2004, and which, in turn, claimed the benefit of Chinese Patent Application No. 03110039.2, which was filed on Apr. 9, 2003, the entire disclosures of which are hereby incorporated herein by reference.

BACKGROUND OF THE DISCLOSURE

1. Field of the Technology

The present invention relates to Wavelength Division Multiplexing (WDM) techniques and, more particularly, to an inter-card channel protection method in a WDM system.

2. Background of the Invention

Along with the fast development of WDM techniques and the doubled increment of the transmission rate of WDM system, it is necessary to pay attention to the security and reliability of transmission channels in the network. There are, however, drawbacks in the existing methods of inner-card channel protection as well as methods of inter-card channel protection supported by system control unit.

FIG. 1 shows the solution of one technique in the prior art. FIG. 1a and FIG. 1b are the schematics illustrating the transmitting end and receiving end of inner-card channel protection, respectively. Cards supporting inner-card channel protection include those of Optical conversion unit (OCU) type and Optical transponder unit (OTU) type. At the transmitting end, signal from a card is divided by a coupler into two identical paths, which can be configured such that one is the primary path while the other is the standby path. The signal of the two paths is transmitted via different routes to the receiving end. At the receiving end, both paths of signal enter the card and one of the two is selected. Under normal circumstances, signal of the primary path is selected while the card can make switching depending on the signal quality of the two paths. Refer to G.841 of ITU-T for the external commands and local switching conditions of signal quality.

Drawbacks of this solution are: 1. It is impossible to implement device-level protection, protection can not be provided when there is a failure with the card or with an essential element thereon 2. The unit price of such a card is relatively high, for the card has to be of the type of double outputs/alternative inputs, it has to receive two paths of signal, detect the signal quality of both paths as well as implement within the card the selection of one path from the two. Although the unit price is lower than that of two cards of single output/single input, it is much higher than the price of one card of simplex. In comparison, inter-card channel protection requires two cards of simplex at both the transmitting end and the receiving end while inner-card protection requires one card of dual transmission with selective receiving at both the transmitting end and receiving end. Although inner-card protection costs less, it has little advantage. For the two cards used in inter-card protection may be configured in the non-protection mode and used for transmitting another client signal, respectively, thereby transmitting double amount of data while the card used in inner-card protection can not be used for transmission of other data even if it is configured in the non-protection mode.

FIG. 2a and FIG. 2b show another solution in the prior art. Cards supporting inter-card channel protection supported by system control unit in accordance with this solution include OCU cards and OTU cards. At the transmitting end, signals from the client side are divided by a coupler into two paths and are provided for two cards, respectively. The two paths of signal transmitted from the two cards are sent to the receiving end through different routes. At the receiving end, the two paths of signal enter two cards, respectively, while the system control unit controls the lasers at the client side of the two cards in accordance with the signal qualities submitted by the two cards such that the laser being selected switches on and the laser not selected switches off. Thus, the selected path of signal from the client side of the two cards is transmitted down to the client side. Under normal circumstances, the signal from the primary card is selected. Refer to G.841 of ITU-T for handling of the external commands and local switching conditions of signal quality. This solution, however, has the following drawbacks: 1. Even with proper configuration, the system control unit has to be involved to implement the protection switching. If the system control unit fails, protection will be impossible 2. Since it is needed for the cards to submit to the system control unit the switching conditions and for the system control unit to issue to the card the switching command, the speed is low.

SUMMARY OF THE INVENTION

In accordance with one aspect, the present invention is aimed at providing an inter-card channel protection method in a WDM system, which is able to provide device-level protection as well as protection for a failed card or failed essential chips thereon even with a failure of the system control unit.

An inter-card channel protection method in a WDM system may include: at the transmitting end, signals from the client side being divided via a coupler into two paths which are delivered to a primary card and a standby card, respectively; the two paths of signal transmitted by the two cards being sent via different routes to the receiving end; at the receiving end, the two paths of signal entering a primary card and a standby card, respectively; and the two cards communicating each other directly with the standby card submitting the signal quality to the primary card and the primary card making selection based on the submitted signal quality and the signal quality of its own, thereby deciding whether the primary card or the standby card is selected to work; and where the selected path of signal of the two cards is sent down to the client side.

In some cases, said direct communication between the primary card and standby card further includes: the standby card reporting the signal quality of its own card, and the primary card commanding the standby card to switch on/off the lasers at the client side.

Additionally or alternatively, deciding whether the signal of the primary card or the signal of the standby card is selected further includes: if the primary card is selected, switching on the laser at the client side of the primary card and switching off the laser at the client side of the standby card; and, if the standby card is selected, switching on the laser at the client side of the standby card and switching off the laser at the client side of the primary card.

In the initial state, if the signal quality of the primary card and the signal quality submitted by the standby card are the same, the primary card may be selected to work.

The method may further include: at the receiving end, the primary card receiving external commands and making protection switching operation based on the switching conditions of the two cards; and, when the primary card is absent, the standby card switching on/off the laser in accordance with the signal quality on its own card.

The method may further include: making initial configuration of the two cards at the receiving end by the system control unit and ensuring the consistency of the configuration of the two cards, where said configuration includes one or more of the following settings: protection pair, revertive mode/wait to restore timer, primary card, and enabling switch for signal degrade event switching.

The method may yet include: after completing the initial configuration, the system control unit giving commands to the cards to save the configurations in flashes, and when a soft or hard reset is later made, extracting the configuration information in the flashes so as to recover the previous configurations of the two cards.

The supported local switching requests in the order of priority from the highest to the lowest may include: (1) clear; (2) card absent; (3) lockout; (4) forced switch; (5) signal fail; (6) signal degrade; (7) manual switch; (8) wait to restore; and, (9) no request. A switching request with high priority may override a request with low priority and the switching request being overridden is no longer reserved. When a switching request with high priority fails or is overridden by a request with even higher priority, a switching operation in accordance with the switching request may be made valid at that time.

In accordance with another aspect of the disclosed solution, only two cards are involved in the protecting process at the receiving end rather than relying on the system control unit. In this way, protection can be made when a card fails or essential chips thereon fail. As the control of switching requires no reference to the system control unit, protection switching can be made even if the system control unit card has a failure. In addition, direct transmission of switching conditions and switching commands between the two cards is faster than communications with the system control unit respectively via mailbox. Practical verification also shows that protection in accordance with this invention is faster than inter-card channel protection supported by system control unit.

DETAILED DESCRIPTION OF PREFERRED EMBODIMENTS

This invention is hereinafter described in detail with reference to specific embodiments and accompanying drawings.

Figure 1A:
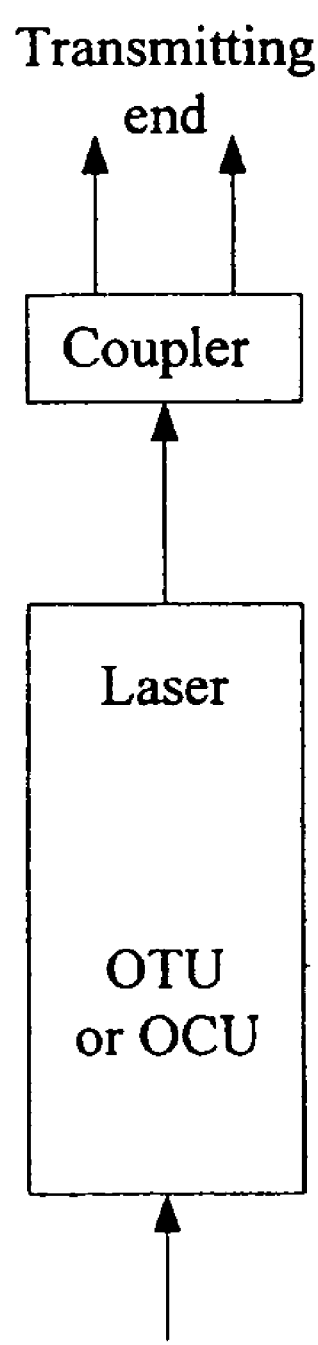
FIGS. 1a and 1b are schematics illustrating the transmitting end and receiving end, respectively, of inner-card channel protection in the prior art.
Figure 1B:
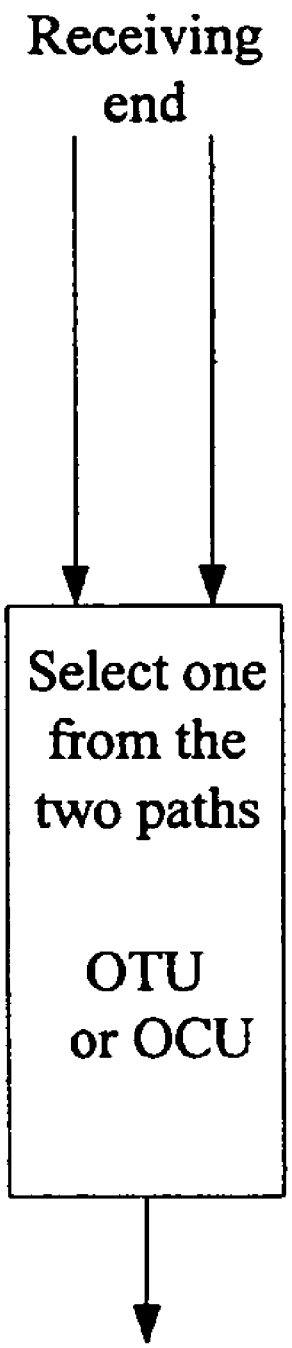
Figure 2A:
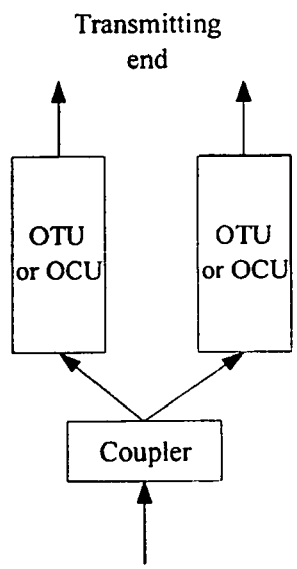
FIGS. 2a and 2b are schematics illustrating the transmitting end and receiving end, respectively, of inter-card channel protection supported by system control unit in the prior art.
Figure 2B:
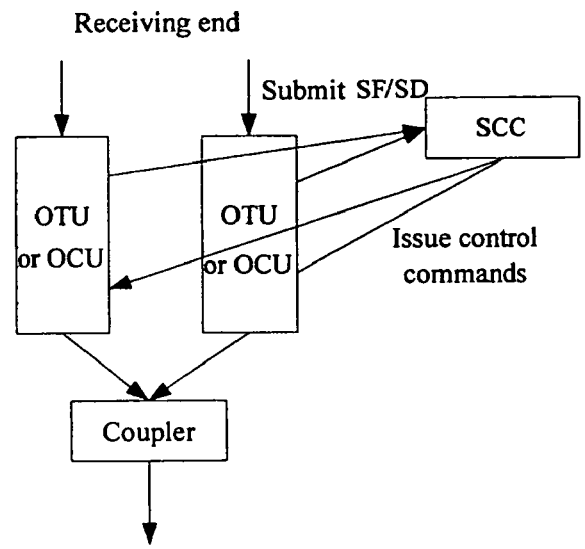
Figure 3A:
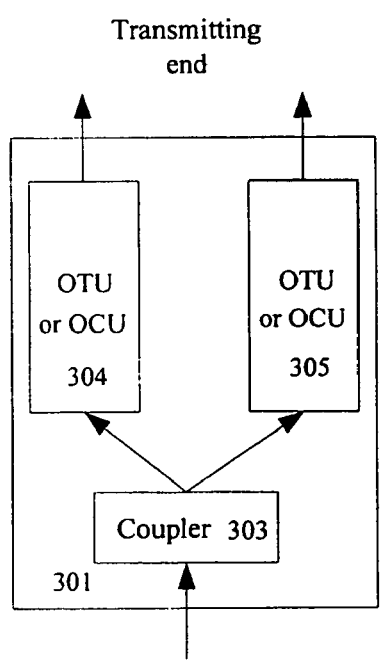
FIGS. 3a and 3b are schematics illustrating the transmitting end and receiving end, respectively, of the inter-card channel protection in accordance with the present invention.
Figure 3B:
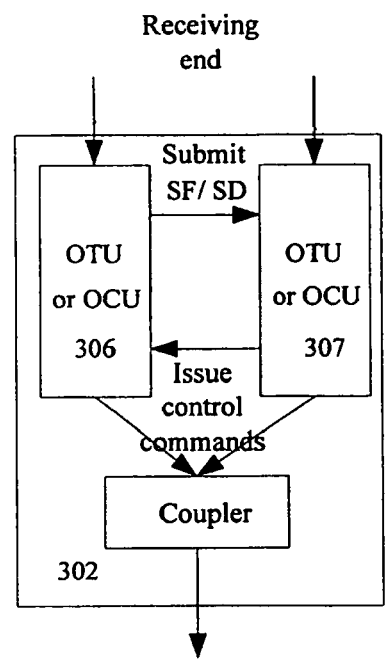

As shown in FIGS. 3a and 3b, the apparatus for implementing the inter-card channel protection method in accordance with this invention comprises a transmitting unit 301 and a receiving unit 302.

Transmitting unit 301 and receiving unit 302 contain two cards and a coupler, respectively. Cards in receiving unit 302 are primary card 307 and standby card 306. The input end of coupler 303 in transmitting unit 301 is connected with the client-side device and the two output ends thereof are connected with the client-side optical transceiver of the two cards, respectively. The output end of the coupler in receiving unit 302 is connected with the client-side device and the two input ends thereof are connected with the client-side optical transceiver of the two cards, respectively. The two cards in the receiving unit contain a quality-checking device for optical signals, respectively.

Based on the structure shown in FIG. 3, the principle of implementing the inter-card channel protection method in accordance with this invention is as follows.

At the transmitting end, optical signals from the client side are divided via the coupler into two paths and delivered to the two cards, respectively; the two paths of signal transmitted by the two cards are sent via different routes to the receiving end.

At the receiving end, the two paths of signal enter two cards, respectively, and the two cards communicate with each other. Each card detects the optical signal received, respectively. The standby card submits the signal quality to the primary card. The primary card decides, according to the signal quality submitted by the standby card and the signal quality of its own card, whether to select the signal of the standby card, and issues to the standby card the command of switching on/off the client-side laser based on the decision. If the standby card is selected, the client-side laser on the standby card is switched on while the client-side laser on the primary card is switched off; and vice versa. The selected path of signal from the client side of the two cards is delivered down to the client side. The primary card and the standby card can communicate directly. The standby card reports to the primary card whether the standby card is in place as well as the switching conditions of its own card; and the primary card needs to report to the standby card whether the primary card is in place and to select or not select the optical signal of the standby card by commanding the standby card to switch on/off the client-side laser thereon.

In the initial state, if the qualities of the optical signals received by the standby card and the primary card are in the same class, the signal of the primary card is typically selected. Later on, the qualities of signal of the two paths will change with the conditions of the optical fibers of the two routes. Conditions of signal quality like signal fail or signal degrade can be set in advance on the cards, and when the optical signal received by a card meets the pre-set conditions, it is considered that the signal currently received by the card fails or deteriorates.

In actual applications, this solution supports various local switching requests, which include in the order of priority from high to low:

1. Clear: clear all the following switching requests, including waiting for recovery.

2. Card absent.

3. Lockout: work only with the primary card.

4. Forced switch: force to switch to the designated card; in the non-revertive mode, it is possible to force to switch to the primary card or to the standby card; in the revertive mode, it is only possible to force to switch to the standby card.

5. Signal fail: in accordance with the signal quality and the conditions of the essential elements on the card, each card may generate a switching request of signal fail.

6. Signal degrade: in accordance with the signal quality, each card may generate a switching request of signal degrade.

7. Manual switch: Switch manually to the designated card; in the non-revertive mode, it is possible to switch manually to the primary card or to the standby card; in the revertive mode, it is only possible to switch manually to the standby card.

8. Wait to restore: when the cards work in the revertive mode and the signal of the standby card is used, if the signals of both the primary and standby cards are normal, then count, and the state at this time is the state of waiting to restore. When the set timer of wait to restore is reached by counting, switch to the primary card.

9. No request: in the non-revertive mode, if no external command is issued or all other external commands are overridden by the command of Clear and both primary and standby cards are normal, the state at this time is the state of no request; in the revertive mode, if no external command is issued or all other external commands are overridden by the command of clear and both primary and standby cards are normal, when the working card is the primary card, the state at this time is the state of no request.

In the above switching requests, requests with higher priority can override requests with lower priority, and the overridden switching requests will be no longer reserved. When a switching request with high priority fails or is overridden by a request with even higher priority, make switching operation in accordance with the switching request valid at that time. Refer to G.841 of ITU-T for the processing of the switching conditions. In addition, this embodiment of the present invention adds the state of card absent as another local switching condition. Card absent means that the card has not plugged on the mother board or the card has broken, indicating a state that the card is unable to work normally. Only when the primary card is absent can the standby card switch on/off the laser in accordance with the signal quality of its own card. The primary card and the standby card can communicate via the mother board or in other ways so as to learn whether the other card is absent.

As this solution does not rely on the system control unit, some initial configurations of the cards are needed and can be stored in the flashes of the two cards at the receiving end. The configuration information can be set at the delivery time of the cards, by special configuration tools, or, most conveniently, by the system control unit. After completing the configuration, the system control unit can be absent or even in the state of failure.

The configuration in this embodiment is described as follows. First, some settings for protection are made with the system control unit and both cards in place. It is the system control unit that ensures the settings are correct and consistent. No verification is made between the two cards. After all the settings are completed, only the two cards are needed to make the relevant protection switching operation, and it does not matter whether the system control unit is in place. Typically, the primary card receives external commands and controls the protection switching operation in accordance with the switching conditions of the two cards. Only when the primary card is absent can the standby card switch on/off the lasers based on the signal quality of its own card. Such settings include: 1. protection pair, set the card positions of the two cards engaged in this protection; 2. revertive mode/wait to restore timer, set whether to be in the revertive mode, if yes, set further the wait to restore timer; 3. primary card, set one card in the protection pair as the primary card, set the other as the standby card; 4. enabling switch for signal degrade (SD) event switching, set whether SD event is used as a switching condition; 5. save setting parameters, after other settings are completed, command the cards to save the settings in the flashes such that the two cards can recover the previous settings after a later soft or hard reset of card even with the system control unit absent.

The invention claimed is:

1. An inter-card channel protection method in a wavelength division multiplexed (WDM) system, the method comprising the steps of:
   at a transmitting end, dividing signals from a client side via a coupler into two paths which are sent to a first primary card and a first standby card, respectively, and sending the two paths of signal transmitted by the two cards via different routes to a receiving end;
   at the receiving end, the two paths of signal entering a second primary card and a second standby card, respectively, and the second primary card and the second standby card communicating with each other directly with the second standby card submitting the signal quality to the second primary card and the second primary card making a selection based on the submitted signal quality and the signal quality of its own, thereby deciding whether the second primary card or the second standby card is selected to work, the selected path of signal of the two cards being transmitted down to a client side,
   wherein a supported local switching request comprises in an order of a priority from the highest to the lowest: (1) clear; (2) card absent; (3) lockout; (4) forced switch; (5) signal fail; (6) signal degrade; (7) manual switch; (8) wait to restore; and, (9) no request; and, wherein the switching request with the higher priority may override the request with the lower priority.

2. The inter-card channel protection method in a WDM system according to claim 1, wherein said direct communication between the second primary card and the second standby card further comprising: the second standby card reporting switching conditions of the second standby card to the second primary card, and the second primary card issuing a command to the second standby card to decide whether the second standby card is selected.

3. The inter-card channel protection method in a WDM system according to claim 1, wherein said deciding whether the primary card or the standby card is selected to work further comprising: if the second primary card is selected, switching off a laser of the second standby card; and, if the second standby card is selected, switching on a laser of the second standby card and switching off the laser of the second primary card.

4. The inter-card channel protection method in a WDM system according to claim 1, wherein the second primary card is selected to work in an initial state if the signal quality of the second primary card and the signal quality of the second standby card are the same.

5. The inter-card channel protection method in a WDM system according to claim 2, further comprising: the second standby card switching on a laser in accordance with the signal quality of the signals received by the second standby card when the second primary card is absent.

6. The inter-card channel protection method in a WDM system according to claim 1, further comprising: a system control unit making an initial configuration of the second primary card and the second standby card at the receiving end, wherein the initial configuration comprises one or more of the following: setting a protection pair, a revertive model restore time, a primary card, and a enabling switch for signal degrade event switching.

7. The inter-card channel protection method in a WOM system according to claim 6, further comprising: after completing the initial configuration, the system control unit giving a command to the second primary card and the second standby card to save the initial configuration in a flash.

8. A method for a communication protection, comprising:
   receiving a first signal and a second signal by a primary card and a standby card respectively, the first signal and the second signal being formed by branching a third signal from a first client and transmitted to the primary card and the standby card;
   receiving, by the primary card, information sent by the standby card, the information indicating a quality of the second signal received by the standby card; and instructing, by the primary card, the standby card to transmit the second signal to a second client according to the quality of the second signal and a quality of the first signal wherein a supported local switching request comprises in an order of a priority from the highest to the lowest: (1) clear; (2) card absent; (3) lockout; (4) forced switch; (5) signal fail; (6) signal degrade; (7) manual switch; (8) wait to restore; and, (9) no request; and, wherein the switching request with the higher priority may override the request with the lower priority.

9. The method according to claim 8, further comprising:
detecting the first signal and the second signal by the primary card and the standby card respectively, and determining the quality of the first signal and the quality of the second signal.

10. The method according to claim 8, comprising:
turning off a laser of the primary card and instructing the standby card to turn on the laser of the standby card to transmit the second signal to the second client.

11. The method according to claim 8, the instructing the standby card to transmit the second signal to the second client comprising:
receiving, by the primary card, switching conditions of the standby card; and
instructing the standby card to transmit the second signal to the second client according to the switching conditions of the standby card.

12. The method according to claim 11, wherein the switching conditions have different priorities, and a request corresponding to the switching condition with a higher priority override a request corresponding to the switching condition with a lower priority.

13. A network device, comprising:
a primary card and a standby card, the primary card and the standby card configured to receive a first signal and a second signal respectively, wherein the first signal and the second signal are formed by branching a third signal from a first client and are transmitted to the primary card and the standby card;
wherein the primary card is configured to receive information indicating a quality of the second signal from the standby card, and instruct the standby card to transmit the second signal to a second client according to the quality of the second signal and a quality of the first signal,
wherein at least one of the primary card and the standby card is configured to generate a supported local switching request, the supported local switching request comprises in an order of a priority from the highest to the lowest: (1) clear; (2) card absent; (3) lockout; (4) forced switch; (5) signal fail; (6) signal degrade; (7) manual switch; (8) wait to restore; and, (9) no request; and, wherein the switching request with the higher priority may override the request with the lower priority.

14. The network device according to claim 13, wherein the primary card is configured to detect the quality of the first signal: the standby card is configured to detect the quality of the second signal.

15. The network device according to claim 13, wherein the primary card is configured to receive switching conditions of the standby card, and instruct the standby card to transmit the second signal to the second client according to the switching conditions of the standby card.

16. The network device according to claim 15, wherein the switching conditions have different priorities, and a request corresponding to the switching condition with a higher priority override a request corresponding to the switching condition with a lower priority.

17. The network device according to claim 13, wherein further comprises a coupler configured to receive the second signal from the standby card and send the second signal to the second client.

* * * * *

UNITED STATES PATENT AND TRADEMARK OFFICE
CERTIFICATE OF CORRECTION

PATENT NO. : 7,701,847 B2 Page 1 of 1
APPLICATION NO. : 11/247312
DATED : April 20, 2010
INVENTOR(S) : Hong Chen et al.

It is certified that error appears in the above-identified patent and that said Letters Patent is hereby corrected as shown below:

In the Claims

In column 6, claim 6, line 51, after "a revertive" replace "model restore" with --mode/restore--.

In column 6, claim 7, line 54, after "method in a" replace "WOM" with --WDM--.

Signed and Sealed this

Third Day of August, 2010

David J. Kappos
*Director of the United States Patent and Trademark Office*